United States Patent
Hopkins et al.

(10) Patent No.: US 12,264,773 B1
(45) Date of Patent: Apr. 1, 2025

(54) TRIPOD MOUNTING PLATES FOR HOUSING TRACKING DEVICES

(71) Applicant: Elevation Lab, Inc., Portland, OR (US)

(72) Inventors: Casey Hopkins, Portland, OR (US); Jacob Hull, Portland, OR (US); Mitchell T. Wilson, Portland, OR (US)

(73) Assignee: Elevation Lab, Inc., Portland, OR (US)

( * ) Notice: Subject to any disclaimer, the term of this patent is extended or adjusted under 35 U.S.C. 154(b) by 0 days.

(21) Appl. No.: 18/405,894

(22) Filed: Jan. 5, 2024

(51) Int. Cl.
*F16M 11/04* (2006.01)
*G03B 17/56* (2021.01)

(52) U.S. Cl.
CPC ........... *F16M 11/04* (2013.01); *G03B 17/561* (2013.01)

(58) Field of Classification Search
CPC .............................. F16M 11/04; G03B 17/561
USPC .......................................................... 248/542
See application file for complete search history.

(56) References Cited

U.S. PATENT DOCUMENTS

| | | | |
|---|---|---|---|
| 675,213 | A | 5/1901 | Harris |
| 714,538 | A | 11/1902 | Walter |
| 1,785,186 | A | 12/1930 | Day |
| 2,013,485 | A | 9/1935 | Bary et al. |
| 2,491,166 | A | 12/1949 | Di Stiso |
| 2,515,551 | A | 7/1950 | Cohen |
| 3,312,255 | A | 4/1967 | Ellison |
| 3,608,685 | A | 9/1971 | Childress |
| 3,953,722 | A | 4/1976 | Stick |
| 4,531,310 | A | 7/1985 | Acson et al. |
| 4,597,206 | A | 7/1986 | Benson |
| 5,288,044 | A * | 2/1994 | Chen ................... F16M 11/2014 248/183.1 |
| 5,397,086 | A * | 3/1995 | Chen ................... F16M 11/2014 396/428 |
| D375,695 | S | 11/1996 | Narai |
| 5,585,867 | A | 12/1996 | Ooya |
| 5,748,087 | A | 5/1998 | Ingargiola et al. |

(Continued)

FOREIGN PATENT DOCUMENTS

| | | |
|---|---|---|
| CN | 306512384 | 11/2020 |
| CN | 306806113 | 5/2021 |

(Continued)

OTHER PUBLICATIONS

Catalyst Lifestyle Limited, "Stick-It" Product Page, https://catalystlifestyle.com/products/total-protection-airtag-stick-it-case?variant=39616587038829, (Apr. 24, 2023).

(Continued)

*Primary Examiner* — Todd M Epps
(74) *Attorney, Agent, or Firm* — Kolitch Romano Dascenzo Gates LLC (57) ABSTRACT

Tripod mounting plates for mounting a tracking device on a to-be-tracked device comprise a housing and a coupler. The housing is configured to be operatively coupled to a tripod, and the housing defines a recess configured to selectively receive and retain the tracking device. The coupler is operatively coupled to the housing and configured to be operatively coupled to the to-be-tracked device. In some examples, the to-be-tracked device comprises a camera and/or any other suitable device configured to be mounted on the tripod. The tripod mounting plates are configured to facilitate mounting the tracking device on the to-be-tracked device and mounting the to-be-tracked device on the tripod.

22 Claims, 5 Drawing Sheets

(56) References Cited

U.S. PATENT DOCUMENTS

| | | |
|---|---|---|
| D402,805 S | 12/1998 | Nagano et al. |
| 5,878,698 A | 3/1999 | Lyell |
| D407,985 S | 4/1999 | Pimentel |
| D414,186 S | 9/1999 | Hogenbirk |
| D415,480 S | 10/1999 | Kendall et al. |
| D440,397 S | 4/2001 | Bardet |
| 6,243,870 B1 | 6/2001 | Graber |
| D447,067 S | 8/2001 | Vollenweider |
| D511,699 S | 11/2005 | Pan |
| 6,970,090 B1 | 11/2005 | Sciarra |
| D556,938 S | 12/2007 | Russello et al. |
| D571,557 S | 6/2008 | Lawler |
| D575,649 S | 8/2008 | Scalisi et al. |
| 7,450,835 B2 * | 11/2008 | Lackey ............... G03B 17/561 348/211.6 |
| D598,018 S | 8/2009 | Sumii |
| 7,598,869 B2 | 10/2009 | Kumagai et al. |
| D609,123 S | 2/2010 | Pace |
| 7,780,972 B2 | 8/2010 | Hurwitz |
| D632,853 S | 2/2011 | Hardi et al. |
| D633,644 S | 3/2011 | Sprengers |
| D647,227 S | 10/2011 | Kaule et al. |
| 8,148,701 B2 | 4/2012 | Yoder |
| D661,846 S | 6/2012 | Miller et al. |
| 8,195,313 B1 | 6/2012 | Fadell et al. |
| D666,367 S | 8/2012 | Miller et al. |
| D683,251 S | 5/2013 | Dumas et al. |
| D703,394 S | 4/2014 | Bozeman |
| D713,103 S | 9/2014 | Sproviero et al. |
| D726,161 S | 4/2015 | Howard et al. |
| D729,773 S | 5/2015 | Salojarvi et al. |
| D735,131 S | 7/2015 | Akana et al. |
| D750,980 S | 3/2016 | Takach et al. |
| D752,588 S | 3/2016 | Li |
| D757,585 S | 5/2016 | Højmose |
| D757,587 S | 5/2016 | Li |
| 9,526,433 B2 | 12/2016 | Lapetina et al. |
| D779,977 S | 2/2017 | Jacob et al. |
| D781,572 S | 3/2017 | Duval |
| D783,422 S | 4/2017 | Kashimoto |
| D790,514 S | 6/2017 | Woodward et al. |
| D795,109 S | 8/2017 | Olodort et al. |
| D803,410 S | 11/2017 | Im et al. |
| D804,533 S | 12/2017 | Mangum et al. |
| D812,577 S | 3/2018 | Turksu et al. |
| D817,332 S | 5/2018 | Yaprak et al. |
| D817,558 S | 5/2018 | Lee et al. |
| D817,793 S | 5/2018 | Vu et al. |
| D818,854 S | 5/2018 | Kachar et al. |
| D820,238 S | 6/2018 | Boshernitzan et al. |
| D820,318 S | 6/2018 | Mullins et al. |
| 9,996,996 B2 | 6/2018 | Siebels et al. |
| D822,921 S | 7/2018 | Wen |
| D822,922 S | 7/2018 | Wen |
| D825,549 S | 8/2018 | Lebovitz |
| D826,748 S | 8/2018 | Kim et al. |
| 10,176,691 B2 | 1/2019 | Smoak |
| D843,238 S | 3/2019 | Rose et al. |
| 10,271,524 B2 | 4/2019 | Chen |
| 10,305,178 B2 | 5/2019 | Gibson et al. |
| D852,150 S | 6/2019 | Turksu et al. |
| D854,950 S | 7/2019 | Seum et al. |
| D858,904 S | 9/2019 | Zinn et al. |
| D865,859 S | 11/2019 | Ben Avi |
| D867,909 S | 11/2019 | Kachar |
| D870,399 S | 12/2019 | Van Curen et al. |
| D883,581 S | 5/2020 | Daly et al. |
| D890,002 S | 7/2020 | Cound et al. |
| D890,754 S | 7/2020 | Raken et al. |
| D895,465 S | 9/2020 | Loew et al. |
| D896,798 S | 9/2020 | Yang |
| D898,613 S | 10/2020 | Stapleton |
| D900,812 S | 11/2020 | Friedman et al. |
| D911,191 S | 2/2021 | Qi |
| D920,138 S | 5/2021 | Kuwashiro et al. |
| D926,396 S | 7/2021 | Jia |
| D929,051 S | 8/2021 | Li |
| 11,160,335 B2 | 11/2021 | Eidelman et al. |
| D938,668 S | 12/2021 | Jia |
| D939,972 S | 1/2022 | Erbacher et al. |
| 11,224,301 B2 | 1/2022 | Delgado Carmona |
| D943,438 S | 2/2022 | Chen |
| D943,845 S | 2/2022 | Li |
| 11,308,744 B1 | 4/2022 | Exantus |
| D952,961 S | 5/2022 | Li |
| D956,765 S | 7/2022 | Lee et al. |
| 11,393,319 B1 | 7/2022 | Maisano, II et al. |
| D960,013 S | 8/2022 | Konen et al. |
| D960,129 S | 8/2022 | Karimi et al. |
| D960,562 S | 8/2022 | Lee et al. |
| D964,667 S | 9/2022 | Mo |
| D970,372 S | 11/2022 | Aneja |
| D977,278 S | 2/2023 | Ramm et al. |
| D983,066 S | 4/2023 | Wright et al. |
| D983,786 S | 4/2023 | Herrmann |
| D1,009,464 S * | 1/2024 | Zhang ........................... D3/247 |
| 11,910,888 B1 * | 2/2024 | Hopkins .................. A44B 9/16 |
| 11,931,643 B1 * | 3/2024 | Hopkins ............... A63C 11/003 |
| 11,934,902 B1 * | 3/2024 | Hopkins ........... G06K 19/07758 |
| 2002/0197960 A1 | 12/2002 | Lee et al. |
| 2006/0061546 A1 | 3/2006 | Jong |
| 2007/0034165 A1 | 2/2007 | Yang |
| 2007/0253192 A1 | 11/2007 | Monteiro et al. |
| 2008/0165056 A1 | 7/2008 | Bader |
| 2008/0198585 A1 | 8/2008 | Tait |
| 2009/0322480 A1 | 12/2009 | Benedict et al. |
| 2010/0147854 A1 | 6/2010 | Fauveau |
| 2010/0238033 A1 | 9/2010 | Blumel et al. |
| 2012/0033898 A1 | 2/2012 | Barron |
| 2012/0118980 A1 | 5/2012 | Yoder |
| 2012/0147594 A1 | 6/2012 | Tait |
| 2013/0208938 A1 | 8/2013 | Midha |
| 2014/0002239 A1 | 1/2014 | Rayner |
| 2014/0180019 A1 | 6/2014 | Martinez et al. |
| 2014/0331942 A1 | 11/2014 | Sarazyn |
| 2015/0150319 A1 | 6/2015 | Walmsley |
| 2015/0297134 A1 | 10/2015 | Albert et al. |
| 2015/0356861 A1 | 12/2015 | Daoura et al. |
| 2015/0356862 A1 | 12/2015 | Daoura et al. |
| 2015/0359127 A1 | 12/2015 | Daoura et al. |
| 2016/0058149 A1 | 3/2016 | Dhanasekaran |
| 2016/0071392 A1 | 3/2016 | Hankey et al. |
| 2016/0247156 A1 | 8/2016 | Hwang et al. |
| 2016/0247379 A1 | 8/2016 | Forbes |
| 2016/0266606 A1 | 9/2016 | Ricci |
| 2016/0291162 A1 | 10/2016 | Larkins |
| 2017/0079336 A1 | 3/2017 | Hirschberg et al. |
| 2017/0135315 A1 | 5/2017 | Marmen et al. |
| 2017/0135414 A1 | 5/2017 | Fultz |
| 2017/0192344 A1 * | 7/2017 | Chi .................. B29C 45/14811 |
| 2017/0302099 A1 | 10/2017 | Bolden et al. |
| 2017/0360169 A1 | 12/2017 | Stein |
| 2018/0299991 A1 | 10/2018 | Juhasz et al. |
| 2018/0325426 A1 | 11/2018 | Shaw et al. |
| 2019/0103012 A1 | 4/2019 | Daoura et al. |
| 2020/0107522 A1 | 4/2020 | Kersey et al. |
| 2020/0169848 A1 | 5/2020 | Daoura et al. |
| 2020/0272031 A1 * | 8/2020 | Zhu ........................ F16M 11/041 |
| 2020/0337162 A1 | 10/2020 | Perkins et al. |
| 2020/0352300 A1 | 11/2020 | Sube |
| 2021/0020020 A1 | 1/2021 | Rothschild et al. |
| 2021/0274315 A1 | 9/2021 | Daoura et al. |
| 2021/0274754 A1 | 9/2021 | Talley et al. |
| 2021/0306807 A1 | 9/2021 | Kashani-Nejad et al. |
| 2021/0307294 A1 | 10/2021 | Kimbel |
| 2022/0051182 A1 | 2/2022 | Fox et al. |
| 2022/0137491 A1 * | 5/2022 | Stankie ........... H04M 1/724092 396/428 |
| 2022/0140431 A1 | 5/2022 | Moon |
| 2022/0265214 A1 | 8/2022 | Jariwala et al. |
| 2023/0109754 A1 | 4/2023 | Newton |

(56) References Cited

U.S. PATENT DOCUMENTS

FOREIGN PATENT DOCUMENTS

| | | | | |
|---|---|---|---|---|
| CN | 306806204 | 6/2021 | | |
| CN | 306820796 | 6/2021 | | |
| CN | 307127923 | 9/2021 | | |
| CN | 307552161 | 4/2022 | | |
| DE | 3929468 C1 | 3/1991 | | |
| EM | EU008844344-0001 | 3/2022 | | |
| EM | EU008869267-0006 | 3/2022 | | |
| GB | 6189757 | 2/2022 | | |
| GB | 6194869 | 3/2022 | | |
| GB | 6194870 | 3/2022 | | |
| JP | H0544379 U | 6/1993 | | |
| WO | WO2022251483 | 12/2022 | | |
| WO | WO-2022251483 A1 * | 12/2022 | ............... | A45B 3/00 |
| WO | WO2013117879 A1 | 8/2023 | | |

OTHER PUBLICATIONS eBay, "2-Pack Waterproof Airtag Sticker Mount Case for Apple Hidden Air Tag Adhesive," https://ebay.com/itm/195579903589, (Apr. 24, 2023).
Amazon, "New IPX8 Waterproof AirTag Holder/Case," https://www.amazon.com/Waterproof-Adhesive-Sticker-Compati ble-Luggage/dp/B0 BM L9S KPX, (Nov. 16, 2022).
Amazon, "[Upgrade] I PX8 Waterproof Airtag Sticker Mount," https://www.amazon.ca/Upgrade-Waterproof-Adhesive-Protective-Shockproof/dp/B0BRMGPWVK?th=1, (Jan. 12, 2023).
Machine-generated English language translation of German Patent No. DE 3929468 C1 (Mar. 7, 1991).
Machine-generated English language translation of Japanese Patent No. JPH0544379 U (Jun. 15, 1993).

* cited by examiner

TRIPOD MOUNTING PLATES FOR HOUSING TRACKING DEVICES

FIELD

This disclosure relates to tripod mounting plates for housing tracking devices.

INTRODUCTION

In recent years, wireless tracking devices have become popular amongst consumers. Consumers often use wireless tracking devices to track the location of keys, sports equipment, pets, electronic devices, etc. Typically, wireless tracking devices are small and require additional hardware to be physically mounted or coupled to an object that a user desires to track.

SUMMARY

Tripod mounting plates for mounting a tracking device on a to-be-tracked device comprise a housing and a coupler. The housing is configured to be operatively coupled to a tripod, and the housing defines a recess configured to selectively receive and retain the tracking device. The coupler is operatively coupled to the housing and configured to be operatively coupled to the to-be-tracked device.

DETAILED DESCRIPTION

Various aspects and examples of tripod mounting plates for mounting a tracking device on a to-be-tracked device are described below and illustrated in the associated drawings. Unless otherwise specified, a tripod mounting plate in accordance with the present teachings and/or its various components may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

Figure 1:
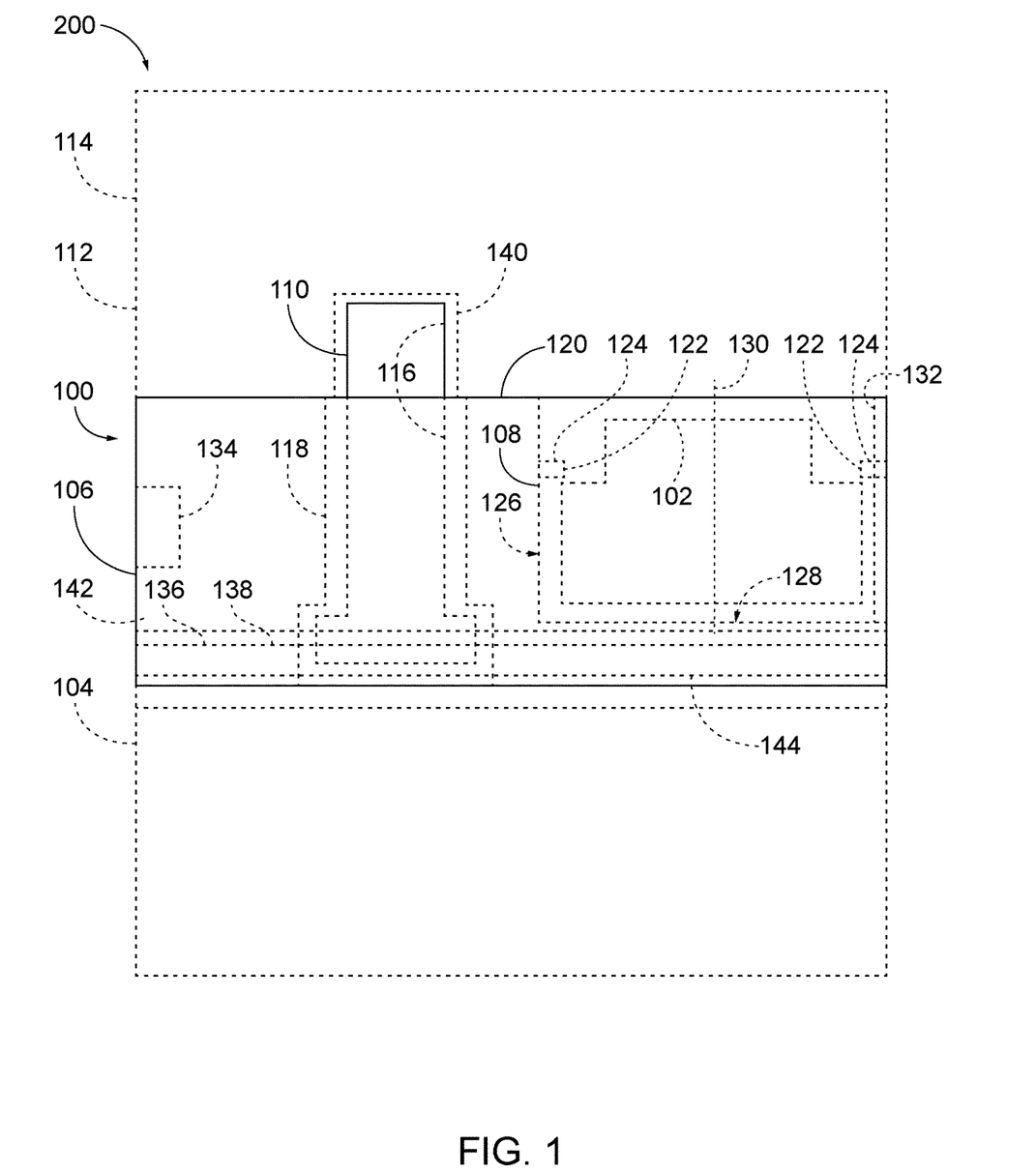
FIG. 1 is a schematic illustration representing tripod mounting plates configured to house tracking devices according to the present disclosure.
Figure 2:
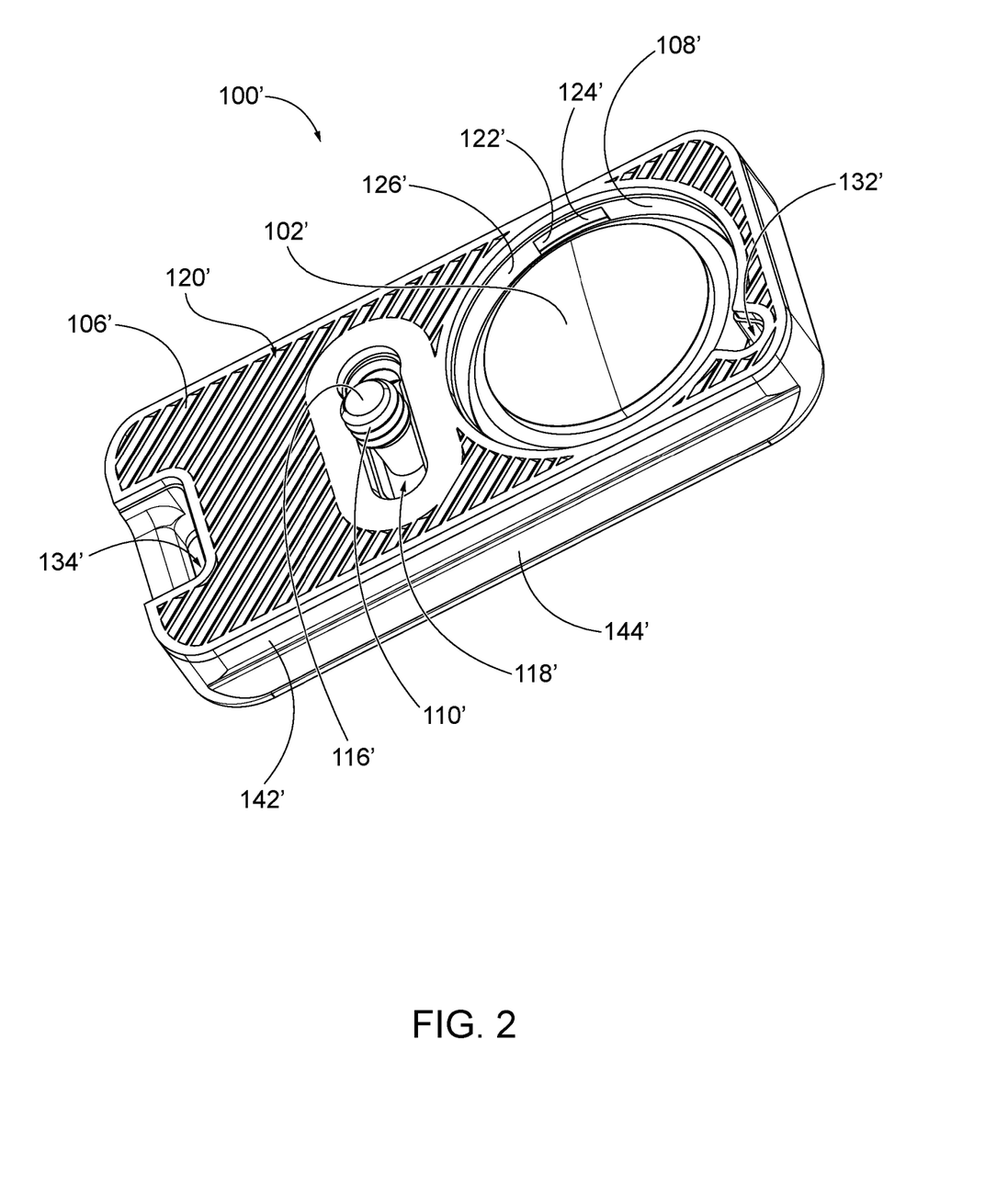
FIG. 2 is an isometric view of an example tripod mounting plate according to the present disclosure.

FIG. 1 schematically represents tripod mounting plates 100. FIGS. 2-5 illustrate an example tripod mounting plate 100'. The tripod mounting plate 100' is a non-limiting example of tripod mounting plates 100 represented in FIG. 1.

As shown in FIG. 1, tripod mounting plates 100 are configured to facilitate mounting a tracking device 102 on a to-be-tracked device 112. The tracking device 102 may comprise any suitable tracking device, e.g., Apple AirTag™, Tile™, Samsung Galaxy SmartTag™, Chipolo One™, CubePro™, Orbit™, and Baseus™ branded tracking devices. In some examples, the to-be-tracked device 112 comprises a camera 114 and/or any other suitable device that is configured to be mounted on a tripod 104. Functionally, tripod mounting plates 100 may be utilized to secure the tracking device 102 to the to-be-tracked device 112 and to mount the to-be-tracked device 112 on the tripod 104.

Tripod mounting plates 100 comprise a housing 106 and a coupler 110. The housing 106 is configured to be operatively coupled to the tripod 104 and to selectively receive and retain the tracking device 102. The housing 106 may comprise any suitable structure(s) configured to selectively receive and retain the tracking device 102, e.g., a recess 108. The coupler 110 is operatively coupled to the housing 106 and configured to be operatively coupled to the to-be-tracked device 112. In other words, the coupler 110 is configured to operatively couple the tripod mounting plate 100 to the to-be-tracked device 112. The coupler 110 may comprise any suitable structure(s) configured to be operatively coupled to the to-be-tracked device 112. The housing 106 and the coupler 110 are configured to facilitate mounting the tracking device 102 on the to-be-tracked device 112 and mounting the to-be-tracked device 112 on the tripod 104.

The housing 106 comprises the recess 108 configured to selectively receive and retain the tracking device 102. In some examples, the housing 106 has an upper surface 120 and the recess 108 is open to the upper surface 120. This facilitates the recess 108 being configured to receive the tracking device 102 through the open upper surface 120 of the housing 106. The recess 108 may have any suitable depth, width, and/or shape (e.g., circular, elliptical, etc.) dependent on the tracking device 102 that the recess 108 is configured to receive. In some examples, the recess 108 may be sized and/or shaped to receive a specific type or brand of tracking device 102, e.g., an Apple AirTag.

In some examples, the housing 106 comprises a retention mechanism 122. Retention mechanism 122 may comprise any suitable structure(s) configured to selectively retain the tracking device 102 within the recess 108 and/or the other suitable structure(s) of the housing 106 that are configured to receive the tracking device 102. In some examples, the retention mechanism 122 is disposed within the recess 108 and configured to selectively retain the tracking device 102 within the recess 108. For example, the housing 106 may comprise a recess wall 126 and a recess floor 128 that define the recess 108, and the recess 108 may have a central axis 130. The retention mechanism 122 may comprise at least one protrusion 124 extending inward from the recess wall 126 and toward the central axis 130. The at least one protrusion 124 is configured to engage the tracking device 102 and to retain the tracking device 102 between the at least one protrusion 124 and the recess wall 126 and the recess floor 128, e.g., in a snap-fit or friction-fit arrangement. In some examples, the at least one protrusion 124 extends annularly at least partially around the perimeter of the recess wall 126. In some examples, the at least one protrusion 124 comprises two or more protrusions extending inward from the recess wall 126 on opposing sides of the recess 108.

In some examples, the recess 108 comprises a device-removal portion 132 configured to facilitate selective removal of the tracking device 102 from the recess 108. For example, the device-removal portion 132 may be a portion of the recess 108 that extends outward from a generally circular portion of the recess 108. The device-removal portion is configured to allow a user to insert a user's finger or another object beneath or against a lateral side of the tracking device 102 within the recess 108 to remove the tracking device 102 from the recess 108. The device-removal portion 132 is configured to allow the selective removal of the tracking device 102 by a user, and without causing the tracking device 102 to be removed from the recess 108 without user input.

The housing 106 is configured to be operatively coupled to the tripod 104. In some examples, the housing 106 may be sized and/or shaped similarly to standard tripod plates that are configured to be received and accommodated by standard tripod mounting systems. For example, the housing 106 may be sized, shaped, and/or have an external contour in accordance with the Arca-Swiss™ standard for tripod mounting plates, e.g., 35 millimeters (mm) width. Thus, tripod mounting plates 100 may be configured to be operatively coupled to any tripod that is configured to accommodate Arca-Swiss standard tripod plates. In such examples, the housing 106 may comprise a side wall 142 having a tapered wall portion 144. The tapered wall portion 144 may have a taper angle of 45 degrees according to the Arca-Swiss™ standard. This facilitates the housing 106 being configured to be engaged by standard Arca-Swiss™ style clamps to operatively couple the housing 106 to the tripod 104. In other examples, the housing 106 may have any other suitable dimensions to facilitate coupling the housing 106 to any suitable tripod 104.

In some examples, the coupler 110 may comprise a male-threaded member 116 that is configured to be coupled to a female member 140 of the to-be-tracked device 112. In some examples, the to-be-tracked device 112 comprises a camera 114, and the male-threaded member 116 has a standard tripod-mounting screw size, e.g., ¼ inch diameter and twenty threads per inch, or ⅜ inch diameter and twenty threads per inch. This facilitates operatively coupling the tripod mounting plate 100 to a plurality of different cameras 114 and/or other to-be-tracked devices 112 that are configured to be coupled to standard tripod plates.

The coupler 110 may be operatively coupled to the housing 106 in any suitable manner. In some examples, the coupler 110 is coupled to the housing 106, such that a position of the coupler 110 is configured to be selectively adjustable relative to the housing 106. For example, the housing 106 may define a slot 118 that is configured to receive the coupler 110. In some examples, the coupler 110 comprises the male-threaded member 116 and the male-threaded member 116 extends through the slot 118. The male-threaded member 116 is configured to be selectively translated within the slot 118 to adjust the position of the male-threaded member 116 relative to the housing 106. In some examples, the slot 118 extends at least partially laterally or latitudinally across the housing 106 (e.g., into and out of the page as schematically represented in FIG. 1), such that the latitudinal position of the male-threaded member 116 relative to the housing 106 is configured to be adjusted by translating the male-threaded member 116 within the slot 118. The male-threaded member 116 extends through the slot 118, such that the male-threaded member 116 extends upward beyond the upper surface 120 of the housing 106. This allows the to-be-tracked device 112 to be positioned above the upper surface 120 of the housing 106 when the to-be-tracked device 112 is operatively coupled to the coupler 110. In some examples, the to-be-tracked device 112 is configured to fully cover the recess 108 and the tracking device 102 therein when the to-be-tracked device 112 is coupled to the coupler 110. Accordingly in such examples, the recess 108 and any tracking device 102 operatively received within the recess 108 will be hidden from view. That is, in some examples, the recess 108 and/or the tracking device 102 is only visible via the upper surface 120 of the housing 106. As a result, if a to-be-tracked device 112 is stolen or goes missing, one may not realize that the to-be-tracked device 112 is being tracked and thus, one may not necessarily remove the tripod mounting plate 100 from the to-be-tracked device 112.

In some examples, the housing 106 comprises an attachment slot 134 extending through the housing 106 at a distal end of the housing 106. The attachment slot 134 is configured to facilitate coupling any suitable one or more accessories to the housing 106, e.g., a carabiner, a key chain, etc. The attachment slot 134 may have any suitable shape and/or size configured to facilitate coupling the housing 106 to the accessories. In some examples, the housing 106 may have multiple attachment slots each configured to receive one or more accessories.

As shown in FIG. 1, in some examples the tripod mounting plates 100 are a part of a system 200. System 200 may comprise the tripod mounting plate 100, the tracking device 102, the tripod 104, and/or the to-be-tracked device 112. In system 200, the tripod mounting plate 100 may be operatively coupled to one or both the tripod 104 and the to-be-tracked device 112. The tracking device 102 is housed in the tripod mounting plate 100, e.g., within the recess 108 of the housing 106.

The tripod 104 may be operatively coupled to the tripod mounting plate 100 in any suitable manner. For example, the tripod 104 may comprise a plate-retention mechanism 136 configured to selectively retain and release the tripod mounting plate 100. In some examples, the plate-retention mechanism 136 comprises a clamp 138 configured to selectively engage the housing 106 of the tripod mounting plate 100. In some examples, the clamp 138 may be an Arca-Swiss™ standard clamp configured to engage and accommodate an Arca-Swiss™ standard plate. In such examples as described above, the housing 106 of the tripod mounting plate 100 may have the dimensions (e.g., 35 mm width) and the 45-degree tapered wall portion 144 of Arca-Swiss standard plates to facilitate tripod mounting plates 100 being compatible with the Arca-Swiss standard clamp 138.

The tracking device 102 may be housed in the tripod mounting plate 100 in any suitable manner. In some examples, the tracking device 102 is operably received in the recess 108 of the housing 106 of the tripod mounting plate 100. A user may insert the tracking device 102 within the recess 108 through the open upper surface 120 of the housing 106. In some examples, the tracking device 102 is retained in the recess 108 by the retention mechanism 122. For example, the retention mechanism 122 may comprise the at least one protrusion 124 extending inward from the recess wall 126 of the recess 108 and engaging the tracking device 102. The tracking device 102 is received within the recess 108, such that the tracking device 102 is selectively removable from the recess 108 by a user. In some examples, the recess 108 comprises the device-removal portion 132 configured to allow a user to selectively remove the tracking device 102 from the recess 108 using their finger or other suitable object.

The system 200 further comprises the to-be-tracked device 112 operatively coupled to the coupler 110 of the tripod mounting plate 100. The to-be-tracked device 112 may comprise any suitable devices (e.g., the camera 114) configured to be mounted on the tripod 104. In some examples, the to-be-tracked device 112 comprises a female member 140 which receives the coupler 110 to operatively couple the to-be-tracked device 112 to the tripod mounting plate 100. In some examples, the female member comprises an internal thread which is mated with an external thread of the coupler 110. For example, the coupler 110 may comprise the male-threaded member 116 which is operatively coupled to the female member 140 of the to-be-tracked device 112 via the threads. In some examples, the female member 140 and the male-threaded member 116 have standard screw dimensions for camera tripod mounts, e.g., ¼" diameter and twenty threads per inch or ⅜" diameter and twenty threads per inch. The to-be-tracked device 112 is operatively coupled to the coupler 110, such that the to-be-tracked device 112 covers the upper surface 120 of the housing 106 and the recess 108. This obstructs the tracking device 102 from view of a user when the to-be-tracked device is coupled to the coupler 110. In the event that the to-be-tracked device 112 is stolen or lost while coupled to the tripod mounting plate 100, obstructing the view of the tracking device 102 may prevent an individual from finding and removing the tracking device 102. In other words, in some examples the housing 106 prevents visibility of the recess 108 and the tracking device 102 held therein other than via the upper surface 120 of the housing 106.

Turning now to FIGS. 2-5, a non-exclusive example of a tripod mounting plate 100 in the form of tripod mounting plate 100' is illustrated. Tripod mounting plates 100 are not limited to the specific embodiment of the illustrated tripod mounting plate 100', and tripod mounting plates 100 may incorporate any number of the various aspects, configurations, characteristics, properties, etc. of tripod mounting plates 100 that are illustrated in and discussed with reference to the schematic representations of FIG. 1 and/or the embodiment of FIGS. 2-5, as well as variations thereof, without requiring the inclusion of all such aspects, configurations, characteristics, properties, etc.

As shown in FIGS. 2-5, tripod mounting plate 100' comprises a housing 106' and a coupler 110'. The housing 106' of tripod mounting plate 100' is generally in the shape of a rectangular prism having rounded corners. The housing 106' is dimensioned according to the Arca-Swiss standard, e.g., 35 mm wide. The housing 106' comprises a side wall 142 having a tapered wall portion 144. The tapered wall portion 144 has an Arca-Swiss standard taper of 45 degrees. Thus, the housing 106' is configured to be compatible with Arca-Swiss standard tripod quick-release systems.

The housing 106' comprises a recess 108' open to an upper surface 120' of the housing 106'. A tracking device 102' is operatively received within the recess 108'. In the example of FIGS. 2-5, the tracking device 102' comprises an Apple AirTag. However in other examples of the tripod mounting plates described herein, the recess 108' may be configured to receive any suitable type of tracking device 102.

Figure 3:
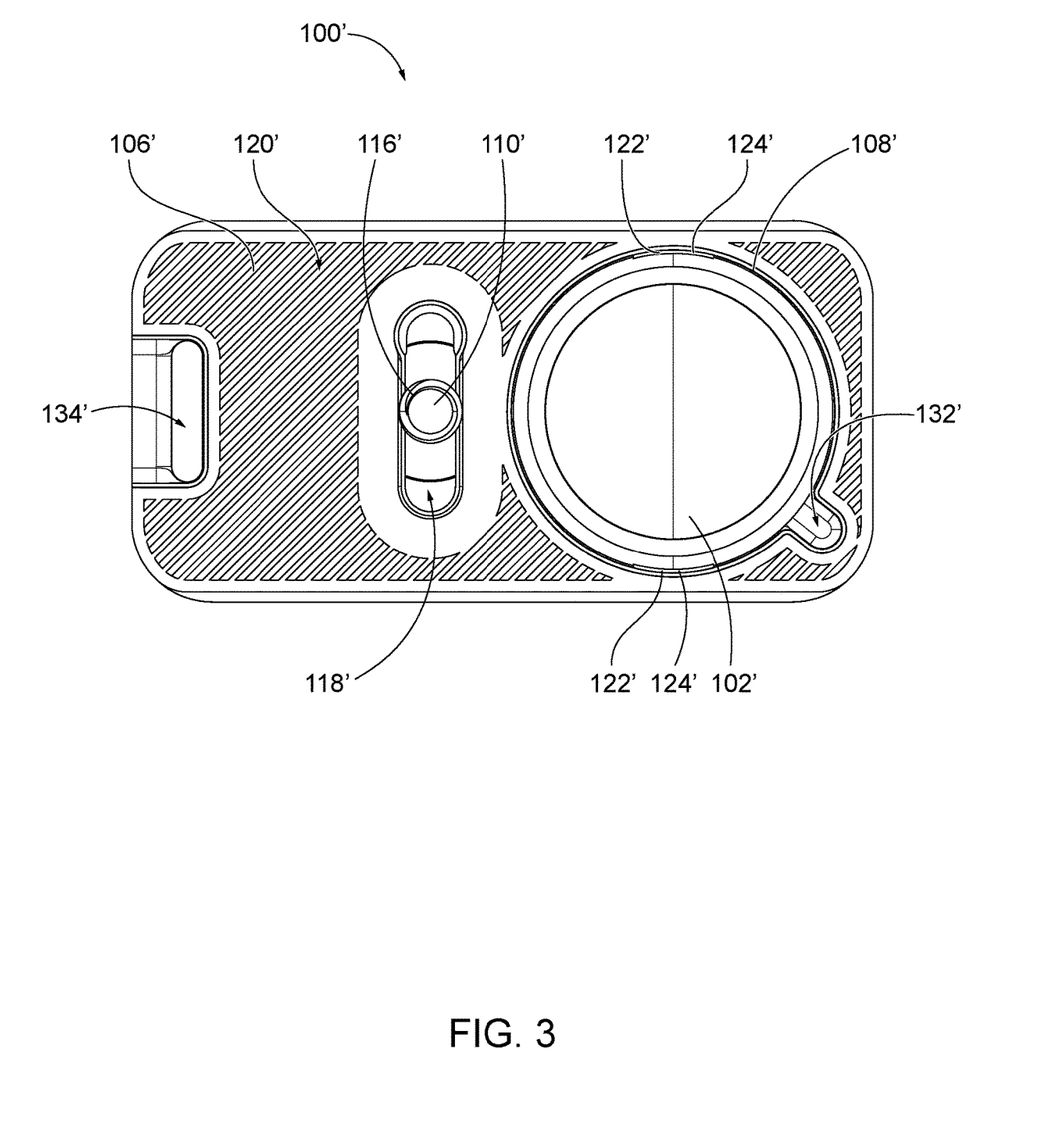
FIG. 3 is a top-side view of the tripod mounting plate of FIG. 2.
Figure 4:
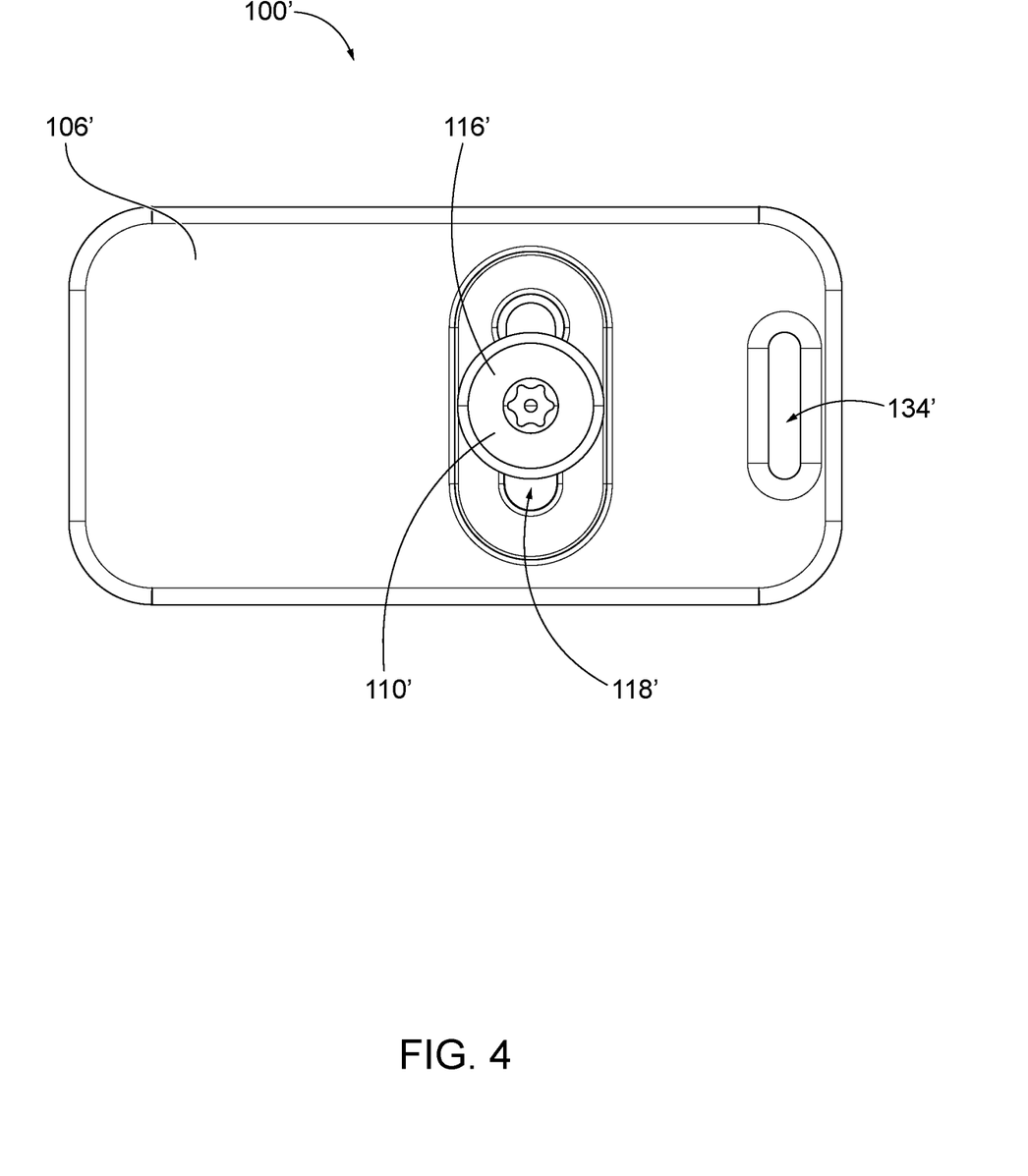
FIG. 4 is a bottom-side view of the tripod mounting plate of FIG. 2.
Figure 5:
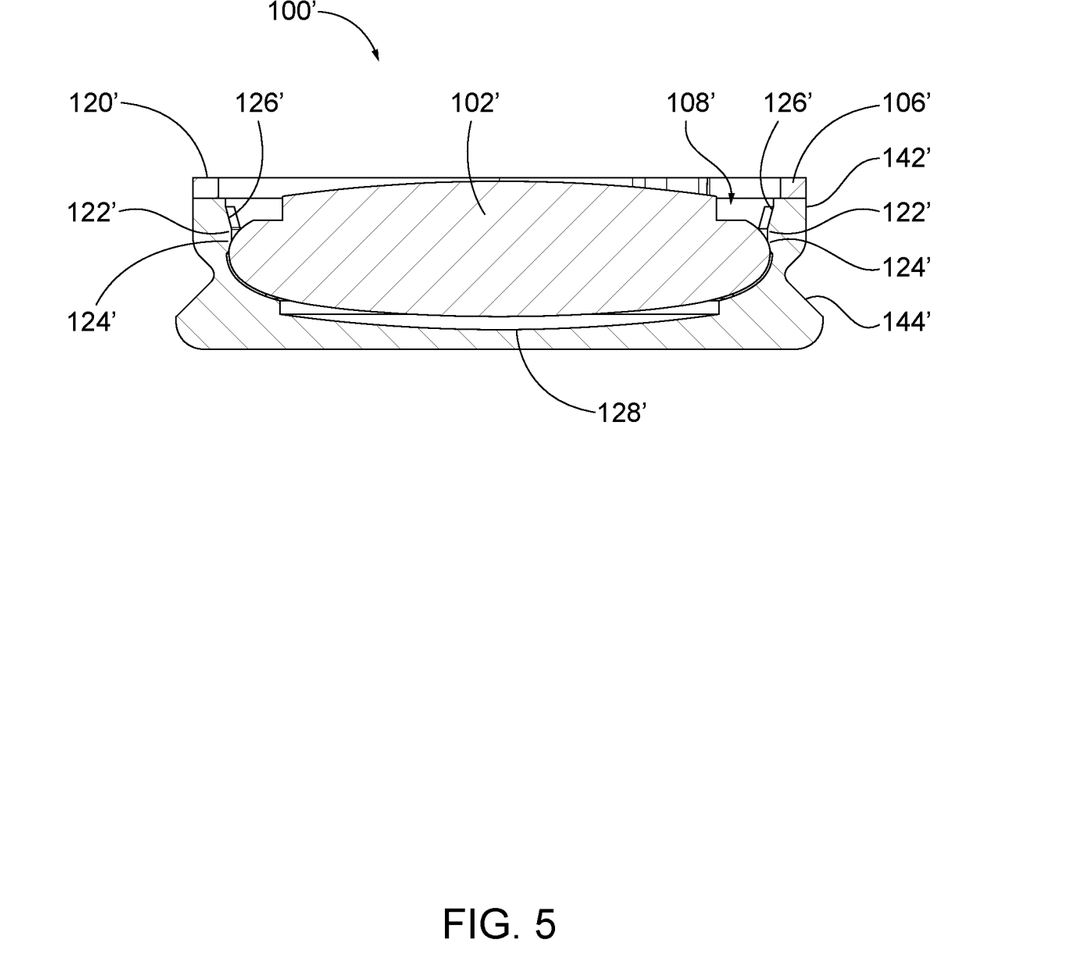
FIG. 5 is a cross-sectional view of the tripod mounting plate of FIG. 2.

The housing 106' comprises a recess wall 126' and a recess floor 128' which defines the recess 108'. A retention mechanism 122' in the form of a pair of protrusions 124' extends inward toward a central axis of the recess 108' from the recess wall 126'. As shown in FIG. 5, the protrusions 124' extend inward from each recess wall 126' on opposing sides of the recess 108'. The protrusions 124' engage the tracking device 102 and retain the tracking device 102 within the recess 108' in a friction-fit arrangement. As shown in FIG. 3, the recess 108' comprises a device-removal portion 132'. The device-removal portion 132' allows for a user to insert the user's finger or another object beneath the tracking device 102' to selectively remove the tracking device 102' from the recess 108'.

The coupler 110' of tripod mounting plate 100' comprises a male-threaded member 116'. Male-threaded member 116' is configured to be operatively coupled to a to-be-tracked device, e.g., the to-be-tracked device 112 or the camera 114 described above with reference to FIG. 1. Male-threaded member 116' comprises a standard threaded screw size for tripod mounts (e.g., ¼" and 20 or ⅜" and 20) to facilitate the coupler 110' being compatible with a plurality of different to-be-tracked devices.

The housing 106' defines a slot 118' and the male-threaded member 116' is received within the slot 118' such that the male-threaded member 116' is operatively coupled to the housing 106'. The male-threaded member 116' is configured to be translated within the slot 118' to selectively adjust a position of the male-threaded member 116' relative to the housing 106'. A threaded portion of the male-threaded member 116' extends above the upper surface 120' of the housing 106' to facilitate coupling the male-threaded member 116' to the camera or other suitable to-be-tracked device.

The housing 106' further comprises an attachment slot 134' extending through the housing 106' at a distal end of the housing 106'. The attachment slot 134' is configured to facilitate coupling any suitable one or more accessories to the housing 106', e.g., a carabiner, a key chain, etc.

Illustrative, non-exclusive examples of inventive subject matter according to the present disclosure are presented in the following enumerated paragraphs. Each of these paragraphs can be combined with one or more other paragraphs, and/or with disclosure from elsewhere in this application, in any suitable manner. The paragraphs below expressly refer to and further limit other paragraphs, providing without limitation examples of some of the suitable combinations.

A. A tripod mounting plate (100) for mounting a tracking device (102) on a to-be-tracked device (112), the tripod mounting plate (100) comprising:

a housing (106) defining a recess (108) configured to selectively receive and retain the tracking device (102), wherein the housing (106) is configured to be operatively coupled to a tripod (104); and     a coupler (110) operatively coupled to the housing (106) and configured to be operatively coupled to the to-be-tracked device (112).

A1. The tripod mounting plate (100) of paragraph A, wherein the to-be-tracked device (112) comprises a camera (114).

A2. The tripod mounting plate (100) of paragraph A or A1, wherein the coupler (110) comprises a male-threaded member (116).

A2.1. The tripod mounting plate (100) of paragraph A2, wherein the housing (106) defines a slot (118), and wherein the male-threaded member (116) extends through the slot (118).

A2.2. The tripod mounting plate (100) of paragraph A2.1, wherein the male-threaded member (116) is configured to be selectively translated within the slot (118) to adjust a position of the male-threaded member (116) relative to the housing (106).

A2.3. The tripod mounting plate (100) of any one of paragraphs A2-A2.2, wherein the housing (106) has an upper surface (120), and wherein the male-threaded member (116) extends upward from the housing (106) beyond the upper surface (120).

A3. The tripod mounting plate (100) of any one of paragraphs A-A2.1, wherein the coupler (110) is configured to be operatively coupled to the to-be-tracked device (112), such that the to-be-tracked device (112) covers the recess (108).

A4. The tripod mounting plate (100) of any one of paragraphs A-A3, wherein the housing (106) comprises a retention mechanism (122) disposed within the recess (108) and configured to selectively retain the tracking device (102) within the recess (108).

A4.1. The tripod mounting plate (100) of paragraph A4, wherein the housing (106) comprises a recess wall (126) and a recess floor (128) that define the recess (108), wherein the recess (108) has a central axis (130), and wherein the retention mechanism (122) comprises at least one protrusion (124) extending inward from the recess wall (126) toward the central axis (130).

A4.2. The tripod mounting plate (100) of paragraph A4.1, wherein the at least one protrusion (124) is configured to engage the tracking device (102) and to retain the tracking device (102) between the at least one protrusion (124) and the recess wall (126) and the recess floor (128) in a snap-fit or friction-fit arrangement.

A5. The tripod mounting plate (100) of any one of paragraphs A-A4.2, wherein the housing (106) has an/the upper surface (120), and wherein the recess (108) is open to the upper surface (120).

A6. The tripod mounting plate (100) of any one of paragraphs A-A5, wherein the recess (108) comprises a device-removal portion (132), wherein the device-removal portion (132) is configured to allow selective removal of the tracking device (102) from the recess (108) by a user.

A7. The tripod mounting plate (100) of any one of paragraphs A-A6, wherein the housing (106) further comprises an attachment slot (134), wherein the attachment slot (134) is configured to be operatively coupled to an accessory.

A7.1. The tripod mounting plate (100) of paragraph A7, wherein the accessory comprises a key chain, a carabiner, and/or any other suitable accessory.

A8. The tripod mounting plate (100) of any one of paragraphs A-A7.1, wherein the housing (106) comprises a side wall (142), wherein the side wall (142) comprises a tapered wall portion (144), and wherein the tapered wall portion (144) is configured to be engaged by a clamp (138) of the tripod (104) to operatively couple the tripod mounting plate (100) to the tripod (104).

A8.1. The tripod mounting plate (100) of paragraph A8, wherein the tapered wall portion has a 45-degree taper angle.

A9. A system comprising:
the tripod mounting plate (100) of any one of paragraphs A-A8.

A10. The system of paragraph A9, further comprising the tripod (104) operatively coupled to the tripod mounting plate (100).

A10.1. The system of paragraph A10, wherein the tripod (104) comprises a plate-retention mechanism (136) configured to selectively retain and release the tripod mounting plate (100).

A10.2. The system of paragraph A10.1, wherein the plate-retention mechanism (136) comprises a clamp (138) configured to selectively engage the tripod mounting plate (100).

A11. The system of any one of paragraphs A9-A10.2, further comprising the tracking device (102).

A11.1. The system of paragraph A11, wherein the tracking device (102) is operatively received within the recess (108).

A11.2. The system of paragraph A11.1, wherein the tracking device (102) is configured to be selectively removable from the recess (108).

A12. The system of any one of paragraphs A9-A11.2, wherein the tracking device (102) comprises an Apple AirTag™ device.

A13. The system of any one of paragraphs A9-A12, further comprising the to-be-tracked device (112) operatively coupled to the coupler (110).

A13.1. The system of paragraph A13, wherein the to-be-tracked device (112) comprises a female member (140) configured to receive the coupler (110), to operatively couple the to-be-tracked device (112) to the tripod mounting plate (100).

A13.2. The system of any of paragraphs A13 or A13.1, wherein the female member (140) comprises an internal thread configured to mate with an external thread of the coupler (110).

The different embodiments and examples of the tripod mounting plates described herein provide several advantages over known solutions for mounting tracking devices on to-be-tracked devices. For example, illustrative embodiments and examples described herein allow a tripod mounting plate that is configured to facilitate mounting a tracking device (e.g., an Apple AirTag™) on a to-be-tracked device (e.g., a camera) and mounting the to-be-tracked device on a tripod.

Additionally and among other benefits, illustrative embodiments and examples described herein allow a tripod mounting plate that is sized and/or shaped according to standard tripod plate dimensions (e.g., the Arca-Swiss™ standard), such that the tripod mounting plate is compatible with a plurality of different standard tripods.

Additionally and among other benefits, illustrative embodiments and examples described herein allow a tripod mounting plate that is configured to securely house any suitable tracking device, such that a user may track the location of their camera and/or other suitable device that is configured to be mounted on the tripod.

No known system or device can perform these functions. However, not all embodiments and examples described herein provide the same advantages or the same degree of advantage.

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

The invention claimed is:

1. A tripod mounting plate for mounting a tracking device on a to-be-tracked device, the tripod mounting plate comprising:
   a housing defining a recess configured to selectively receive and retain the tracking device, wherein the recess is sized to receive an entirety of the tracking device, wherein the housing is configured to be operatively coupled to a tripod, wherein the housing comprises a retention mechanism disposed within the recess and configured to selectively retain the tracking device within the recess; and
   a coupler operatively coupled to the housing and configured to be operatively coupled to the to-be-tracked device with the tracking device received in the recess of the housing.

2. The tripod mounting plate of claim 1, wherein the to-be-tracked device comprises a camera.

3. The tripod mounting plate of claim 1, wherein the coupler comprises a male-threaded member.

4. The tripod mounting plate of claim 3, wherein the housing defines an oblong slot, and wherein the male-threaded member extends through the oblong slot.

5. The tripod mounting plate of claim 4, wherein the male-threaded member is configured to be selectively translated within the oblong slot to adjust a lateral position of the male-threaded member relative to the housing.

6. The tripod mounting plate of claim 1, wherein the coupler is configured to be operatively coupled to the to-be-tracked device, such that the to-be-tracked device covers the recess.

7. The tripod mounting plate of claim 1, wherein the housing comprises a recess wall and a recess floor that define the recess, wherein the recess has a central axis, and wherein the retention mechanism comprises at least one protrusion extending inward from the recess wall toward the central axis.

8. The tripod mounting plate of claim 7, wherein the at least one protrusion is configured to engage the tracking device and to retain the tracking device between the at least one protrusion and the recess wall and the recess floor in a friction-fit arrangement.

9. The tripod mounting plate of claim 1, wherein the housing has an upper surface, and wherein the recess is open to the upper surface.

10. The tripod mounting plate of claim 1, wherein the recess comprises a device-removal portion, and wherein the device-removal portion is configured to allow selective removal of the tracking device from the recess by a user.

11. The tripod mounting plate of claim 1, wherein the housing comprises a side wall, wherein the side wall comprises a tapered wall portion, and wherein the tapered wall portion is configured to be engaged by a clamp of the tripod to operatively couple the tripod mounting plate to the tripod.

12. The tripod mounting plate of claim 1, further comprising the tracking device, wherein the entirety of the tracking device is received in the recess.

13. A system comprising:
   a tripod mounting plate for mounting a tracking device on a to-be-tracked device, the tripod mounting plate comprising:
      a housing defining a recess configured to selectively receive and retain the tracking device, wherein the recess is sized to receive an entirety of the tracking device; and
      a coupler operatively coupled to the housing and configured to be operatively coupled to the to-be-tracked device with the tracking device received in the recess of the housing; and
   a tripod comprising a plate-retention mechanism configured to selectively retain and release the tripod mounting plate, wherein the plate-retention mechanism comprises a clamp configured to selectively engage the tripod mounting plate.

14. The system of claim 13, further comprising the tracking device operatively received within the recess.

15. The system of claim 14, wherein the tracking device is configured to be selectively removable from the recess.

16. The system of claim 13, further comprising the to-be-tracked device operatively coupled to the coupler.

17. The system of claim 16, wherein the coupler is received in a female member of the to-be-tracked device to operatively couple the to-be-tracked device to the tripod mounting plate.

18. A tripod mounting plate for mounting an Apple AirTag™ device on a to-be-tracked device, the tripod mounting plate comprising:
   a housing defining a recess configured to selectively receive and retain the Apple AirTag™ device, wherein the recess is sized to receive an entirety of the Apple AirTag™ device, and wherein the housing is configured to be operatively coupled to a tripod; and
   a coupler operatively coupled to the housing and configured to be operatively coupled to the to-be-tracked device.

19. The tripod mounting plate of claim 18, further comprising the Apple AirTag™ device, wherein the entirety of the Apple AirTag™ device is received in the recess.

20. A tripod mounting plate for mounting a tracking device on a to-be-tracked device, the tripod mounting plate comprising:
   a housing defining a recess configured to selectively receive and retain the tracking device, wherein the recess is sized to receive an entirety of the tracking device, wherein the housing is configured to be operatively coupled to a tripod, wherein the recess comprises a device-removal portion, and wherein the device-removal portion is configured to allow selective removal of the tracking device from the recess by a user; and
   a coupler operatively coupled to the housing and configured to be operatively coupled to the to-be-tracked device with the tracking device received in the recess of the housing.

21. The tripod mounting plate of claim 20, wherein the coupler is configured to be operatively coupled to the to-be-tracked device, such that the to-be-tracked device covers the recess.

22. The tripod mounting plate of claim 20, wherein the housing has an upper surface, and wherein the recess is open to the upper surface.

* * * * *